(12) United States Patent
Shindo

(10) Patent No.: US 10,293,723 B2
(45) Date of Patent: May 21, 2019

(54) SURFACE STRUCTURE OF WADDED SEAT AND METHOD OF MANUFACTURING SURFACE STRUCTURE OF WADDED SEAT

(71) Applicant: TACHI-S CO., LTD., Akishima-shi, Tokyo (JP)

(72) Inventor: Takashi Shindo, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 465 days.

(21) Appl. No.: 15/112,834

(22) PCT Filed: Sep. 22, 2014

(86) PCT No.: PCT/JP2014/075052
§ 371 (c)(1),
(2) Date: Jul. 20, 2016

(87) PCT Pub. No.: WO2015/114877
PCT Pub. Date: Aug. 6, 2015

(65) Prior Publication Data
US 2016/0339819 A1   Nov. 24, 2016

(30) Foreign Application Priority Data
Feb. 3, 2014 (JP) .................................. 2014-018318

(51) Int. Cl.
*B68G 7/05* (2006.01)
*B60N 2/70* (2006.01)
*B60N 2/58* (2006.01)

(52) U.S. Cl.
CPC .......... *B60N 2/5883* (2013.01); *B60N 2/5891* (2013.01); *B60N 2/70* (2013.01); *B60N 2/7017* (2013.01); *B68G 7/05* (2013.01)

(58) Field of Classification Search
CPC ...... B60N 2/5883; B60N 2/5891; B60N 2/70; B60N 2/7017; B68H 7/05
(Continued)

(56) References Cited

U.S. PATENT DOCUMENTS 5,016,941 A * 5/1991 Yokota ................... B60N 2/70
297/452.61
5,395,473 A * 3/1995 Nixon .................. B60N 2/5891
297/452.62
(Continued)

FOREIGN PATENT DOCUMENTS

DE   102009000559 A1   8/2010
EP      1816018 B1     8/2007
(Continued)

OTHER PUBLICATIONS

Extended European Search Report for corresponding Application No. 14880945.2-1754/3090896 PCT/JP2014075052; dated Aug. 10, 2017.
(Continued)

*Primary Examiner* — Anthony D Barfield
(74) *Attorney, Agent, or Firm* — Cantor Colburn LLP

(57) ABSTRACT

A surface structure of wadded seat, with a trim cover having a plurality of trim cover pieces backed with wadding members and sewed together at ends, further includes: first sewed portions, each formed by sewing two adjacent trim cover pieces at one end of each trim cover piece, while serving as seam allowance, the portions not backed with the wadding members; second sewed portions, each formed first by forming a continuous trim cover piece, then by laying a long wadding member on the backs of the wadding members, and finally by sewing, at both ends of the continuous trim cover piece, the wadding members on the backs of the trim cover pieces and the long wadding member; and third sewed portions, each formed by sewing, at both ends of each first sewed portion, the long wadding member to the end of each trim cover piece.

5 Claims, 4 Drawing Sheets

(58) Field of Classification Search
USPC .................................................. 297/452.62
See application file for complete search history.

(56) References Cited

U.S. PATENT DOCUMENTS

| | | | | |
|---|---|---|---|---|
| 5,669,670 | A | * | 9/1997 | Haraguchi ............... B68G 7/05 |
| | | | | 297/452.62 |
| 8,783,768 | B2 | * | 7/2014 | Severinski ........... B60N 2/5891 |
| | | | | 297/218.1 |
| 2008/0093830 | A1 | | 4/2008 | Takezawa et al. |

FOREIGN PATENT DOCUMENTS

| | | | |
|---|---|---|---|
| GB | 796614 A | | 6/1958 |
| JP | 02109498 U1 | | 8/1990 |
| JP | 05-018399 U | | 3/1993 |
| JP | 2005053435 A | | 3/2005 |
| JP | 2005124673 A | | 5/2005 |
| JP | 2006117092 A | | 5/2006 |
| JP | 2012081091 A | | 4/2012 |
| WO | 03080312 A1 | | 10/2003 |
| WO | 2006028206 A1 | | 3/2006 |
| WO | WO-2016051843 A1 | * | 4/2016 ............... B68G 7/05 |

OTHER PUBLICATIONS

International Search Report corresponding to Application No. PCT/JP2014/075052; dated Dec. 22, 2014, with English translation.

* cited by examiner

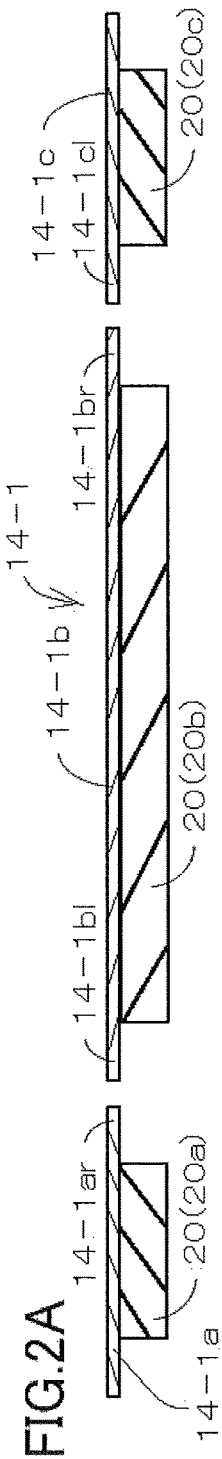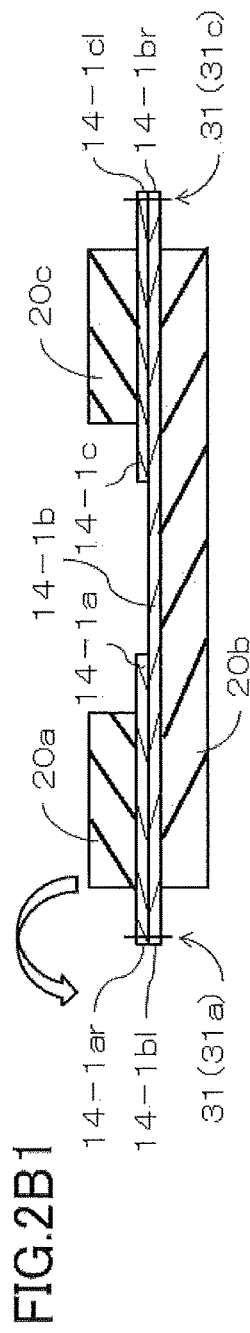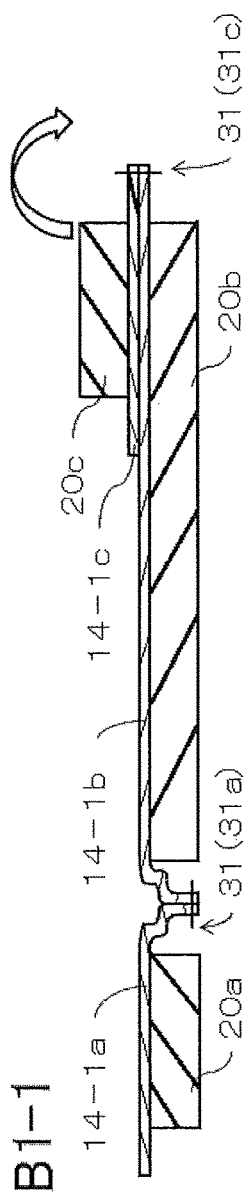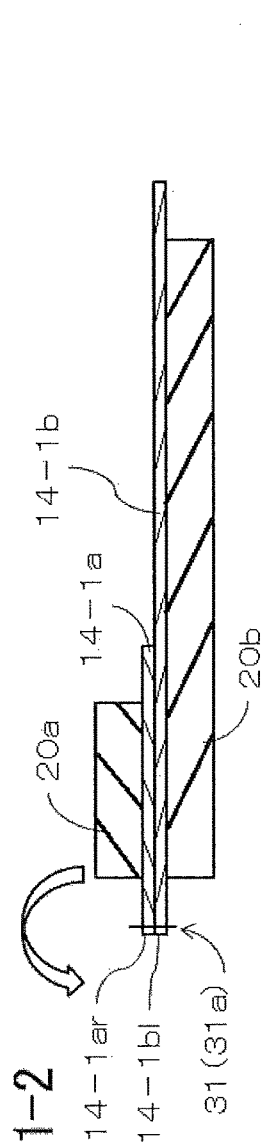
FIG.2A  FIG.2B1  FIG.2B1-1  FIG.2B1-2

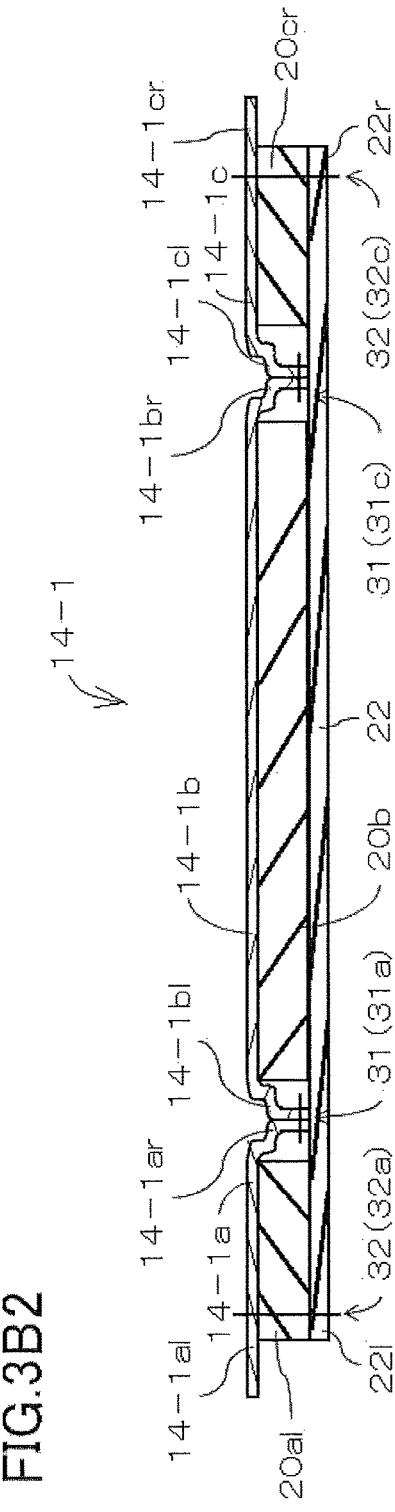
FIG.3B2
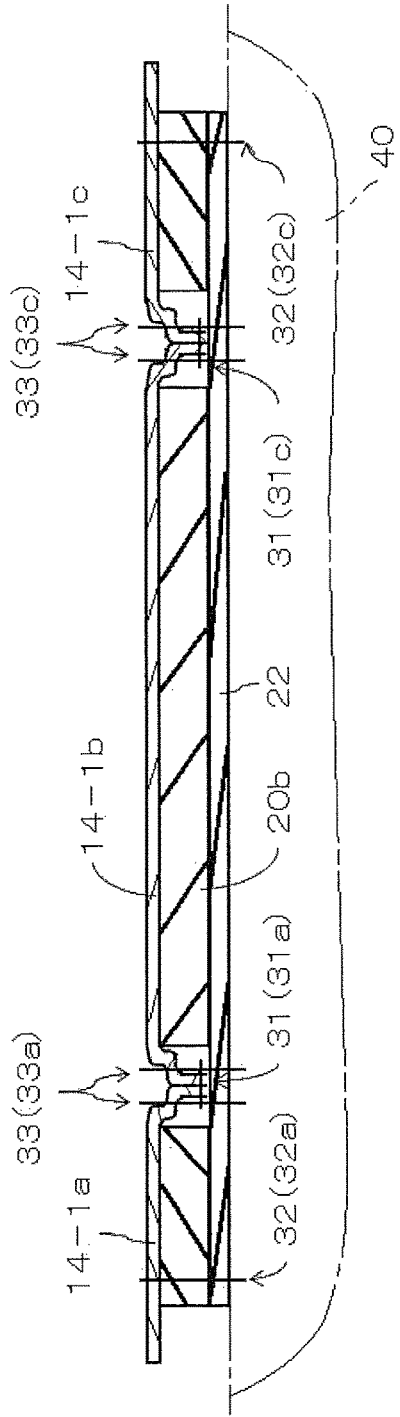
FIG.3B3

SURFACE STRUCTURE OF WADDED SEAT AND METHOD OF MANUFACTURING SURFACE STRUCTURE OF WADDED SEAT

CROSS REFERENCE TO RELATED APPLICATIONS

This is the U.S. national stage of application No. PCT/JP2014/075052 dated Sep. 22, 2014. Priority under 35 U.S.C. § 119(a) and 35 U.S.C. § 365(b) is claimed from Japanese Patent Application No. 2014-018318, filed Feb. 3, 2014, the entire contents of which are incorporated herein by reference.

BACKGROUND OF THE INVENTION

1. Field of the Invention

The present invention relates to a surface structure of wadded seat which includes a trim cover covering a seat pad and also to a method of manufacturing a surface structure of the wadded seat which includes a trim cover covering a seat pad.

2. Description of the Related Art

A vehicle seat comprises a seat cushion and a seatback, each including a seat frame (a seat cushion frame or a seatback frame) which is a skeleton member, a seat pad (foam member) made of, for example, urethane foam, and a trim cover (surface member) which is composed of a plurality of trim cover pieces sewed together and which is shaped like a bag. The seat pad is mounted on the seat frame, and the trim cover covers the seat pad. The vehicle seat is thereby provided.

A console, which is, like the vehicle seat, an inner component of the vehicle, has its skeleton member covered with a seat pad. The seat pad is covered with a trim cover which is composed of a plurality of trim cover pieces sewed together and which is shaped like a bag.

Trim covers are known well, which excel in cushioning property or decorativeness and may therefore impart a luxurious feel to the vehicle seats or consoles. See, for example, JP 05-018399Y and WO 2006/028206. For instance, a thin wadding member is laid on the back of a trim cover made of, for example, synthetic leather, enhancing the cushioning property of the trim cover. Further, two trim cover pieces may be sewed at abutting ends (hereinafter called "trim cover ends," as needed), single-stitched or double-stitched, thereby giving the trim cover decorativeness.

JP 05-018399Y discloses a configuration in which thin wadding members are secured to the back of a the trim cover and a plate-like core piece is sewed to the back of the trim cover. The seat pad has, in the surface, a groove that can hold the core piece. Left and right claws are symmetric to each other and extend from the wall of the groove. When the claws are fitted in the groove made in the sheet pad, the wadded trim cover is attached to the seat pad.

WO 2006/028206 discloses a configuration in which two trim cover pieces have a seam allowance (a margin to seam) each, at one end, and in which the trim cover pieces are sewed to each other, leaving the seam allowances. The ends of each seam allowance, i.e., the ends of the trim cover, are folded onto the back of the trim cover. The seam allowance having ends so folded is single-stitched to a plate-like core piece made of resin. If the core piece is not secured on the back of the trim cover, an additional wadding member will be adhered to the back of the trim cover.

The seat pad has, in one surface, a recess that can hold the core piece. The core piece provided on the trim cover is fitted in the recess and adhered to the seat pad.

Patent Literature 1: Japanese Utility Model unexamined Publication JP 05-018399Y Patent Literature 2: International Publication WO 2006/028206

In the structure disclosed in JP 05-018399Y, the core piece of the trim cover can be firmly fitted in the groove only if the left and right claws are fitted in the groove. However, the use of the core piece increases the number of components required. Further, the core piece is made of hard material so that may not easily disengaged from the claws provided in the groove, unlike the trim cover that is made of soft material such as unwoven cloth. Inevitably, it is not easy to single-stitch the core piece and the trim cover together, which are made of different materials. Further, the single-stitch seam is uneven, lowering the outer appearance of the trim cover. Consequently, the trim cover may fail to have a luxurious feel.

Moreover, a groove must be cut, and a core piece must be fitted in the groove. This inevitably complicates the manufacturing of the trim cover.

In the structure disclosed in WO 2006/028206, the plate-like core piece is fitted in the recess made in the seat pad. The trim cover is therefore firmly secured on the seat pad. Further, the core piece and the seam allowances of trim cover are single-stitched together, improving the decorativeness, i.e., outer appearance, of the trim cover. The core piece is indispensable, however, increasing the number of components required. Still further, the manufacture of the trim cover will be complicated because the core piece is held in the recess with an adhesive agent.

The manufacture of the trim cover is further complicated since the additional wadding member is adhered to those parts of the back of the trim cover, to which core pieces are not secured. Since no wadding member is attached to the core pieces (namely, the core pieces are not backed), any part to which the wadding member is not adhered has no cushioning property. As a result, the occupant sitting on the seat cushion has one feeling at a wadded part and another feeling at a non-wadded part, inevitably feeling not so comfortable.

An object of this invention is to provide a surface structure of wadded seat, which has a good outer appearance and high cushioning property, without increasing the number of components.

Another object of this invention is to provide a method of manufacturing a surface structure of the wadded seat which the manufacture of the trim cover is not complicated.

SUMMARY OF THE INVENTION

In this invention, another wadding member (a long wadding member) is provided below the wadded trim cover pieces and sewed thereto. Thus, two kinds of the wadding member are laid on each other, forming a double-layered structure.

According to one aspect of the embodiment of claim 1, a surface structure of wadded seat which includes a trim cover having a plurality of trim cover pieces backed with wadding members and sewed together at ends, and covering a seat pad, and the surface structure further includes: first sewed portions, each formed by sewing two adjacent trim cover pieces at one end of each trim cover piece, while serving as seam allowance, the portions not backed with the wadding members; second sewed portions, each formed first by forming a continuous trim cover piece made of the sewed trim cover pieces, then by laying a long wadding member on the backs of the wadding members each provided on the back of the continuous trim cover piece, and finally by sewing, at both ends of the continuous trim cover piece, the trim cover pieces, the wadding members on the backs of the trim cover pieces and the long wadding member; and third sewed portions, each formed by sewing, at both ends of each first sewed portion, the long wadding member to the end of each trim cover piece serving as seam allowance.

Moreover, according to one aspect of the embodiment of claim 2, a method of manufacturing a surface structure of wadded seat which includes a trim cover having a plurality of trim cover pieces backed with wadding members and sewed together at ends, and covering a seat pad, and the method further includes: a first step of forming first sewed portions, each by sewing two adjacent trim cover pieces at one end of each trim cover piece, while serving as seam allowance, the portions not backed with the wadding members; a second step of forming second sewed portions, each first by forming a continuous trim cover piece made of the sewed trim cover pieces, then by laying a long wadding member on the backs of the wadding members each provided on the backs of the continuous trim cover pieces, and finally by sewing, at both ends of the continuous trim cover piece, the trim cover pieces, the wadding members on the backs of the trim cover pieces and the long wadding member; and a third step of forming third sewed portions, each by sewing, at both ends of each first sewed portion, the long wadding member to the end of each trim cover piece serving as seam allowance.

In the invention of one aspect of the embodiment of claim 1, the members other than the wadding members, such as core pieces, need not be used, and the number of components does not increase. Further, the trim cover wadded with wadding members can be easily sewed to a long wadding member because they are made of soft material. Therefore, the seams will not be uneven to impair the outer appearance of the trim cover or to fail to impart a luxurious feel to the seat.

On the back of the wadded trim cover made by sewing trim cover pieces at the first sewed portion, the long wadding member is laid. The trim cover therefore acquires cushioning property over its entire surface. Hence, the occupant sitting on the seat cushion does not have a feeling at a wadded part and a different feeling at a non-wadded part, and therefore feels sufficiently comfortable.

In this invention of one aspect of the embodiment of claim 2, a groove need not be made in the seat pad, claws need not be fitted in the groove, and an additional wadding member need not be attached to any parts of the back of the trim cover, to which core pieces are not secured. The manufacture of the trim cover is not complicated.

BRIEF DESCRIPTION OF THE DRAWINGS

FIG. 2A is a schematic diagram explaining the step of backing trim cover pieces with wadding members, prior to sewing the wadding members and the trim cover pieces together;

FIG. 2B1 is a schematic diagram explaining the step of sewing, at one end, the trim cover pieces backed, thereby forming first sewed portions, before the first sewed portions are folded back;

FIG. 2B1-1 is a schematic diagram explaining the step of sewing, at one end, the trim cover pieces backed, thereby forming first sewed portions, after one of the first sewed portions has been folded back;

FIG. 2B2-1 is a schematic diagram explaining the step of forming first sewed portions, in a modification of the step shown in FIG. 2B1;

FIG. 3B2 is a schematic diagram explaining the step of sewing the ends of the trim cover pieces on which the first sewed portions have been formed, thereby forming second sewed portions; and FIG. 3B3 is a schematic diagram explaining the step of further sewing the trim cover pieces on which the second portions have been formed, thereby forming third sewed portions, and corresponds to a magnified sectional view of the seat, taken along line A-A shown in FIG. 1.

DETAILED DESCRIPTION OF THE INVENTION

In one aspect of the embodiments, a surface structure of wadded seat which includes a trim cover having a plurality of trim cover pieces backed with wadding members and sewed together at ends, and covering a seat pad, and the surface structure further includes: first sewed portions, each formed by sewing two adjacent trim cover pieces at one end of each trim cover piece, while serving as seam allowance, the portions not backed with the wadding members; second sewed portions, each formed first by forming a continuous trim cover piece made of the sewed trim cover pieces, then by laying a long wadding member on the backs of the wadding members each provided on the back of the continuous trim cover piece, and finally by sewing, at both ends of the continuous trim cover piece, the trim cover pieces, the wadding members on the backs of the trim cover pieces and the long wadding member; and third sewed portions, each formed by sewing, at both ends of each first sewed portion, the long wadding member to the end of each trim cover piece serving as seam allowance.

Figure 1:
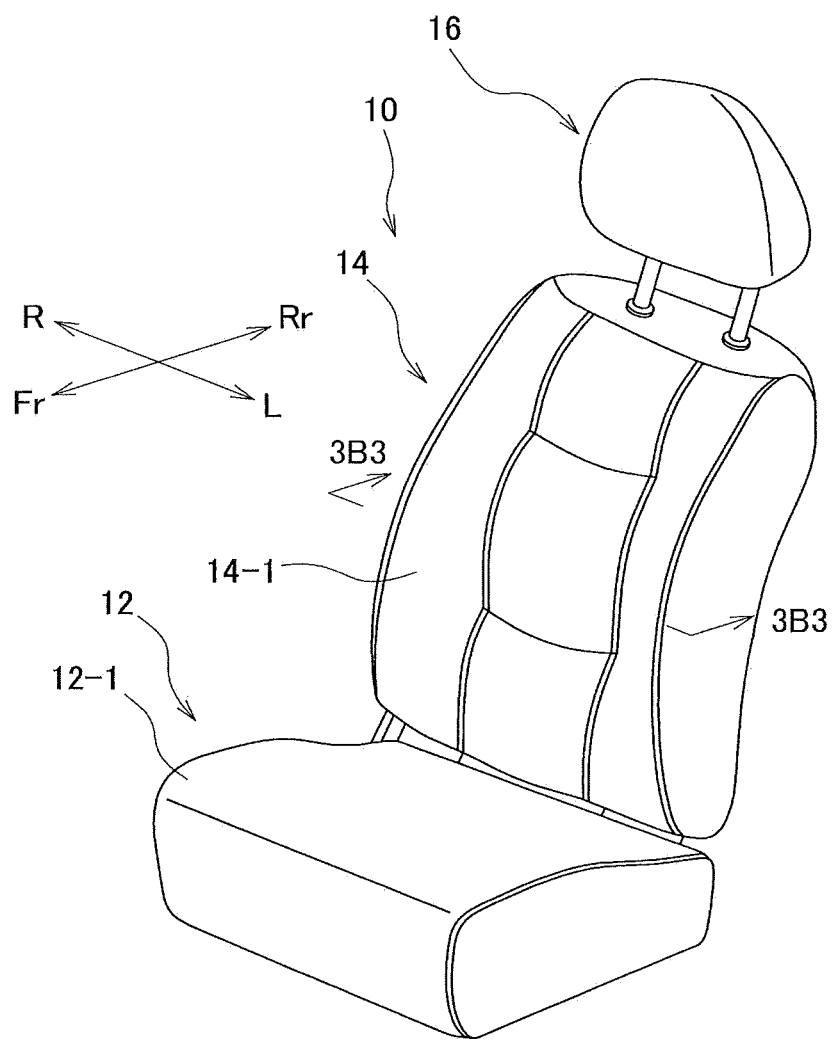
FIG. 1 is a perspective view of a vehicle seat having the surface structure of wadded seat according to a first embodiment of this invention.

Embodiments of this invention will be described with reference to the accompanying drawings. FIG. 1 is a perspective view of a vehicle seat having the surface structure of wadded seat according to a first embodiment of this invention. In the drawings, arrows Fr and Rr indicate the forward and rearward directions, and arrows L and R indicate the leftward and rightward directions, with respect to the driver seated in the driver seat.

As shown in FIG. 1, the vehicle seat 10 has a seat cushion 12 and a seatback 14 provided at the rear end of the seat cushion 12. A headrest 16 is arranged on the top of the seatback 14.

The basic structures of the seat cushion 12 and seatback 14 are known well. The seatback comprises a seatback frame (not shown), a seat pad (not show), and a trim cover (surface member) 14-1. The seatback frame is a skeleton member, and the trim cover has permeability. The seatback frame is constituted by left and right frames and a connecting pipe. The connecting pipe connects the left and right frames at their upper edges, and the seatback frame is substantially U-shaped. The seat pad is made of foam such as urethane foam. The seat pad is mounted on the seat frame and covered with the trim cover 14-1. The seatback 14 is thereby constituted. The seat cushion 12 is similarly constituted, by mounting a seat pad on a seat cushion frame and by covering the seat pad with a trim cover 12-1.

FIG. 2A is a schematic diagram explaining the step of backing trim cover pieces with wadding members, prior to sewing the wadding members and the trim cover pieces together; FIG. 2B1 is a schematic diagram explaining the step of sewing, at one end, the trim cover pieces backed, thereby forming first sewed portions, before the first sewed portions are folded back; FIG. 2B1-1 is a schematic diagram explaining the step of sewing, at one end, the trim cover pieces backed, thereby forming first sewed portions, after one of the first sewed portions has been folded back; FIG. 2B1-2 is a schematic diagram explaining the step of forming first sewed portions, in a modification of the step shown in FIG. 2B1; FIG. 3B2 is a schematic diagram explaining the step of sewing the ends of the trim cover pieces on which the first sewed portions have been formed, thereby forming second sewed portions; and FIG. 3B3 is a schematic diagram explaining the step of further sewing the trim cover pieces on which the second portions have been formed, thereby forming third sewed portions, and corresponds to a magnified sectional view of the seat, taken along line 3B3-3B3 shown in FIG. 1.

The trim cover 14-1 is made as described below. The trim cover 14-1 is made by sewing a plurality of trim cover pieces together and is so shaped as to cover the seat pad. As seen from FIG. 1, the front part of the seatback, namely the front part of the seat pad, consists of, for example, three sections arranged in the transverse direction to hold the occupant's back with a gap as narrow as possible. Similarly, the trim cover 14-1 located in front of the seat pad is composed of three trim cover pieces 14-1a, 14-1b and 14-1c (left, center and right trim cover pieces; see FIG. 2A).

Each of the trim cover pieces 14-1a, 14-1b and 14-1c is backed with first wadding member 20, but not at the seam allowances provided on the left and right ends. Thus, the first wadding member 20 is composed of three wadding members 20a, 20b and 20c. The wadding member 20a is provided on the back of the left trim cover piece 14-1a, the wadding member 20b is provided on the back of the center trim cover piece 14-1b, and the wadding member 20c is provided on the back of the right trim cover piece 14-1c. The trim cover pieces 14-1a, 14-1b and 14-1c may be made of, for example, synthetic leather. In this case, the trim cover 14-1 can acquire a luxurious feel.

The wadding members 20a, 20b and 20c are coated with an adhesive agent, each over two areas extending, for example, 15 mm from the left and right ends, and are adhered to the backs of the trim cover pieces 14-1a, 14-1b and 14-1c, backing the trim cover pieces 14-1a, 14-1b and 14-1c, respectively. The structure is not limited to this, nevertheless. For example, the entire back of each wadding member may be coated with the adhesive agent. Alternatively, the wadding members may be secured to the trim cover pieces by any means other than adhesion. The number of trim cover pieces constituting the trim cover 14-1 is not limited to three, i.e., left, center and right trim cover pieces. Further, the trim cover pieces may have various shapes, to impart a desirable outer appearance to the trim cover.

The wadding members 20a, 20b and 20c are shorter than the trim cover pieces 14-1a, 14-1b and 14-1c associated with them, respectively, in the left-right direction of the vehicle seat. Each trim cover piece has a seam allowance at one end or two seam allowances at both ends. On any seam allowances, no wadding members are provided.

As may be well seen from FIG. 2A, those ends of the trim cover pieces 14-1a and 14-1b, which are adjacent to each other (or opposing each other), serve as seam allowances 14-1ar and 14-1bl. Further, those ends of the trim cover pieces 14-1b and 14-1c, which are adjacent to each other (or opposing each other), serve as seam allowances 14-1br and 14-1cl. Thus, the seam allowance 14-1ar is located at one end (i.e., right end) of the left trim cover piece 14-1a, and the seam allowance 14-1cl is located at one end (i.e., left end) of the right trim cover piece 14-1c. The seam allowances 14-1bl and 14-1br are located at the ends of the center trim cover piece 14-1b, respectively.

The seam allowances 14-1bl and 14-1br, which are the ends of the center trim cover piece 14-1b, are sewed to the seam allowances 14-1ar and 14-1cl of the left and right trim cover pieces 14-1a and 14-1c, respectively. First sewed portions 31 (i.e., 31a and 31c) are thereby formed.

That is, the left trim cover piece 14-1a and the right trim cover piece 14-1c are laid on the left and right ends of the center trim cover piece 14-1b, opposing the center trim cover piece. Then, the left seam allowance 14-1bl of the center trim cover piece and the seam allowance 14-1ar of the left trim cover piece, which is laid on the seam allowance 14-1bl, are sewed together, forming the first left sewed portion 31a on the left. Similarly, the right seam allowance 14-1br of the center trim cover piece and the seam allowance 14-1cl of the right trim cover piece, which is laid on the seam allowance 14-1br, are sewed together, forming the first right sewed portion 31c on the right (see FIG. 2B1).

Then, the left trim cover piece 14-1a laid on the center trim cover piece 14-1b is rotated in the direction of the arrow shown in FIG. 2B1), around the first left sewed portion 31a serving as fulcrum. The left and center trim cover pieces are thereby expanded. The trim cover pieces 14-1a and 14-1b are therefore connected, lying almost flush in the same plane. Similarly, the right trim cover piece 14-1c laid on the center trim cover piece 14-1b is rotated in the direction of the arrow shown in FIG. 2B1-1, around the first right sewed portion 31c serving as fulcrum. The trim cover pieces 14-1b and 14-1c are thereby connected, lying almost flush in the same plane. As a result, the three trim cover pieces 14-1a, 14-1b and 14-1c are connected in one plane, having their surfaces substantially flush with one another and form a continuous trim cover piece.

The process of forming the first sewed portions 31a and 31c is not limited to the process described above. For example, as shown in FIG. 2B1-2, the left sewed portion 31a may be first formed and the right sewed portion 31c may then be formed.

For example, the left trim cover piece 14-1a is laid on the center trim cover piece 14-1b, opposing thereto. The trim cover pieces 14-1a and 14-1b are then sewed at end, forming a first left sewed portion 31a. Then, the left trim cover piece 14-1a is rotated in the direction of arrow, around the first left sewed portion that serves as a hinge. The left and center trim cover pieces are thereby expanded. The left trim cover piece 14-1a and the center trim cover piece 14-1b are therefore connected, lying almost flush in the same plane. Similarly, the right trim cover piece 14-1c is laid on the center trim cover piece, forming a first right sewed portion 31c, connecting the center and right trim cover pieces.

As shown in FIG. 3B2, a long wadding member (second wadding member) 22 is laid (arranged) on the lower surfaces (backs) of the three wadding members 20a, 20b and 20c (i.e., first wadding members) which are provided below the left, center and right trim cover pieces connected by the first sewed portions 31.

As shown in FIG. 3B2, the long wadding member 22 has a length substantially equal to the total length the wadding members provided on the series of trim cover pieces in the left-right direction (transverse direction). The length of the long wadding member 22 is not limited to this value, so long as the length is appropriate. In most cases, the long wadding member (second wadding member) 22 is thinner than the wadding members (i.e., first wadding members) 20a, 20b and 20c provided on the back of the trim cover pieces.

Then, at the adjacent ends of the continuous trim cover piece, the trim cover pieces 14-1a and 14-1c, the wadding members 20a and 20c provided on the lower surfaces (backs) of the trim cover pieces, and the long wadding member 22 are sewed together, forming second sewed portions 32 (portions 32a and 32c). That is, the left end 14-1al of the left trim cover piece 14-1a, the left end 20al of the wadding member 20a provided on the back of the left trim cover piece, and the left end 22l of the long wadding member 22 are sewed together, forming the second left sewed portion 32a. Similarly, the right end 14-1cr of the right trim cover piece, the right end 20cr of the wadding member provided on the back of the right trim cover piece, and the right end 22r of the long wadding member are sewed together, forming the second right sewed portion 32c.

Next, as shown in FIG. 3B3, on the both sides of the first sewed portions 31 (i.e., portions 31a and 31c), the seam allowances 14-1ar, 14-1bl, 14-1br and 14-1cl of the trim cover pieces, and the long wadding member 22 are further sewed together, forming third sewed portions 33 (i.e., portions 33a and 33c).

Namely, the seam allowance 14-1ar of the trim cover piece provided on the left side of the first left sewed portion 31a and the long wadding member 22 are sewed together, and the seam allowance 14-1bl of the center trim over piece provided on the right side of the first left sewed portion 31a and the long wadding member 22 are sewed together, whereby a third left sewed portion 33a is formed. Similarly, the seam allowance 14-1br of the center trim cover piece provided on the left side of the first right sewed portion 31c and the long wadding member 22 are sewed together, and the seam allowance 14-1cl of the right trim cover piece provided on the right side of the first right sewed portion 31c and the long wadding member 22 are sewed together, whereby a third right sewed portion 33c is formed.

The third sewed portions 33 are formed on the sides of the associated first sewed portions 31 by means of, for example, single stitching. Therefore, double stitching is achieved on the surface of the trim cover, forming two stitch rows on two sides of the first sewed portions, respectively.

The first sewed portions 31 connect the plurality of trim cover pieces, and the second sewed portions 32 secure the long wadding member 22 to the backs of the continuous trim cover piece. The wadded trim cover 14-1 which has double stitching on the surface thereof formed by the third sewed portions 33 is mounted on the seat pad to cover it (see FIG. 3B3).

As described above, the wadded trim cover 14-1 is composed of only the trim cover pieces 14-1a, 14-1b and 14-1c and the long wadding member 22 sewed to the backs of the trim cover pieces. No components different from wadding members, such as core pieces, need not be used at all. As a result, the number of components required will not increase.

The long wadding member 22 is made of material as soft as the wadding members 20a, 20b and 20c laid on the backs of the trim cover pieces. The long wadding member 22 can therefore be sewed easily at the second sewed portions 32. Therefore, the seams will not become irregular.

As specified above, double stitching is achieved at the third sewed portions 33, forming two stitch rows on two sides of the first sewed portions, respectively. This improves the trim cover 14-1 in terms of surface appearance, ultimately imparting a luxurious feel to the trim cover.

The first sewed portions 31 connect the trim cover pieces 14-1a, 14-1b and 14-1c. Further, the long wadding member (i.e., second wadding member) 22 is arranged on the backs of the wadded trim cover pieces. The trim cover can therefore have cushioning property in its overall surface. Therefore, the occupant's feeling will not be impaired. Further, the wadding members 20 laid on the backs of the trim cover pieces and the long wadding member 22 may be changed in material or thickness, thereby to change the cushioning property of the trim cover. The trim cover can therefore be used in vehicles of various types.

After the trim cover pieces have been connected, the trim cover 14-1 can be formed, merely by securing the long wadding member 22 by first sewing the second sewed portions 32 and then performing double-stitching at third sewed portions 33. Since the trim cover 14-1 is formed in sewing step only, neither a groove nor claws need be made in or on the seat pad. Hence, the manufacture of the trim cover will not be complicated.

As has been described, the trim cover according to this invention can have a good outer appearance and high cushioning property, without increasing the number of components. Further, the manufacture of the trim cover is no complicated though the trim cover has a plurality of trim cover pieces.

The embodiments have been described to explain this invention, and are not intended to limit the scope of the invention. Accordingly, various changes and modifications may be made within the spirit or scope of this invention, and are of course included in this invention.

Each embodiment described above is a wadded trim cover of the vehicle seat. Nonetheless, this invention can be applied also to a wadded console that is an inner component of the vehicle.

In a wadded console according to the invention, too, the wadded trim cover is manufactured by performing the steps shown in FIG. 2A to FIG. 3B2.

A wadded trim cover 14-1, which is backed with wadding members and serves as console housing, has a plurality of trim cover pieces connected together by first sewed portions 31. A long wadding member 22 is secured to the back by second sewed portions 32, and double-stitching is performed at third sewed portions 33.

Figure 4:
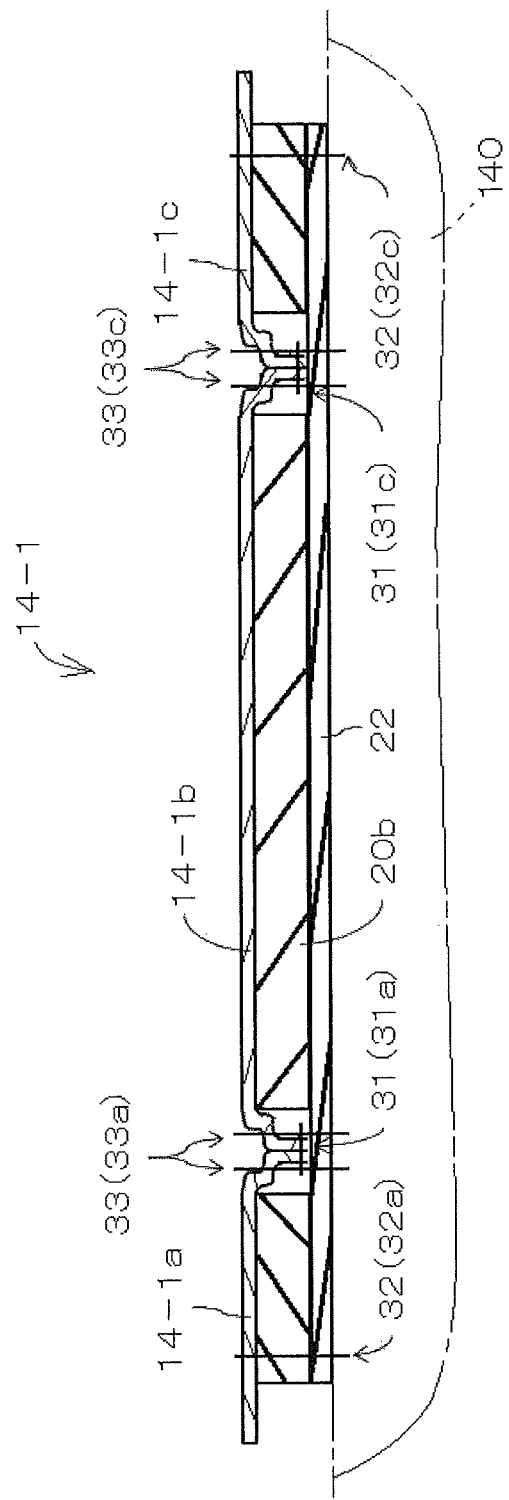
FIG. 4 is a schematic diagram explaining the step of further sewing the trim cover pieces on which the second sewed portion have been formed, according to a second embodiment of this invention, thereby forming third sewed portions, and corresponds to FIG. 3B3 of the first embodiment.

The wadded trim cover 14-1, which is a cover member, is thereby made. As shown in FIG. 4, the wadded trim cover 14-1 is secured, covering the console unit 140. A wadded console is thereby provided.

That is, this invention can provide not only a wadded console, but also a method of manufacturing a wadded console.

INDUSTRIAL APPLICABILITY

The present invention is not limited to ordinary vehicle seats for use in buses, automobiles, etc. Rather, the invention can be applied to any seat that has a seat pad (member of foamed material) covered with a trim cover (surface member), such as seats for use in offices (office seats) and seats for use in public halls, theaters, movie houses and sports facilities.

REFERENCE MARKS IN THE DRAWINGS 10 vehicle seat
12 seat cushion
14 seatback
14-1 trim cover
14-1a, 14-1b, 14-1c left, center and right trim cover pieces
14-1ar, 14-1bl, 14-1br, 14-1cl seam allowances
20(20a,20b,20c) wadding member(s)
22 long wadding member
31 first sewed portions
32 second sewed portions
33 third sewed portions

What is claimed is:

1. A surface structure of wadded seat which includes a trim cover having a plurality of trim cover pieces backed with wadding members and sewed together at ends, and covering a seat pad, and the surface structure further including:
    first sewed portions, each formed by sewing two adjacent trim cover pieces at one end of each trim cover piece, while serving as seam allowance, the portions not backed with the wadding members;
    second sewed portions, each formed first by forming a continuous trim cover piece made of the sewed trim cover pieces, then by laying a long wadding member on the backs of the wadding members each provided on the back of the continuous trim cover piece, and finally by sewing, at both ends of the continuous trim cover piece, the trim cover pieces, the wadding members on the backs of the trim cover pieces and the long wadding member; and
    third sewed portions, each formed by sewing, at both ends of each first sewed portion, the long wadding member to the end of each trim cover piece serving as seam allowance.

2. The surface structure of wadded seat, according to claim 1, wherein:
    the trim cover pieces are three pieces including a left trim cover piece, a center trim cover piece and a right trim cover piece;
    the first sewed portions are positioned at the left and right ends of the center trim cover piece, respectively;
    the second sewed portions are positioned, respectively at the left end of the left trim cover piece and at the right end of the right trim cover; and
    the third sewed portions are positioned, in the form of double stretch, respectively at the adjacent ends of the left and center trim cover pieces and at the adjacent ends of the center and right trim cover pieces.

3. The surface structure of wadded seat, according to claim 1, wherein the long wadding member is thinner than each of the wadding members provided on the backs of the trim cover pieces, respectively.

4. The surface structure of wadded seat, according to claim 3, wherein the wadding members are secured, with an adhesive agent, to the associated trim cover pieces, respectively.

5. A method of manufacturing a surface structure of wadded seat which includes a trim cover having a plurality of trim cover pieces backed with wadding members and sewed together at ends, and covering a seat pad, and the method further including:
    a first step of forming first sewed portions, each by sewing two adjacent trim cover pieces at one end of each trim cover piece, while serving as seam allowance, the portions not backed with the wadding members;
    a second step of forming second sewed portions, each first by forming a continuous trim cover piece made of the sewed trim cover pieces, then by laying a long wadding member on the backs of the wadding members each provided on the backs of the continuous trim cover pieces, and finally by sewing, at both ends of the continuous trim cover piece, the trim cover pieces, the wadding members on the backs of the trim cover pieces and the long wadding member;
    a third step of forming third sewed portions, each by sewing, at both ends of each first sewed portion, the long wadding member to the end of each trim cover piece serving as seam allowance.

* * * * *